(12) United States Patent
Edwards et al.

(10) Patent No.: US 6,757,027 B1
(45) Date of Patent: Jun. 29, 2004

(54) AUTOMATIC VIDEO EDITING

(75) Inventors: Eric Edwards, San Francisco, CA (US); Clay Harvey Fisher, Belmont, CA (US); Kurt Jonach, San Jose, CA (US); Neal Jacob Manowitz, Woodcliff Lake, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 413 days.

(21) Appl. No.: 09/671,766

(22) Filed: Sep. 27, 2000

Related U.S. Application Data

(60) Provisional application No. 60/181,788, filed on Feb. 11, 2000.

(51) Int. Cl.[7] ............................................. H04N 5/222
(52) U.S. Cl. ......................... 348/722; 348/701; 386/52
(58) Field of Search ............................... 348/700, 722, 348/701, 607, 616, 615; 386/52, 68–69, 55; 382/236, 224, 226, 227

(56) References Cited

U.S. PATENT DOCUMENTS

| | | | |
|---|---|---|---|
| 4,707,742 A | * | 11/1987 | Field et al. .................. 348/580 |
| 5,629,988 A | | 5/1997 | Burt et al. |
| 5,732,146 A | * | 3/1998 | Yamada et al. .............. 382/107 |
| 5,881,182 A | | 3/1999 | Fiete et al. |
| 6,014,471 A | | 1/2000 | Barkan et al. |
| 6,016,354 A | | 1/2000 | Lin et al. |
| 6,061,471 A | * | 5/2000 | Coleman, Jr. ................ 382/173 |
| 6,195,458 B1 | * | 2/2001 | Warnick et al. .............. 382/173 |
| 6,301,440 B1 | * | 10/2001 | Bolle et al. .................. 396/128 |
| 6,307,979 B1 | * | 10/2001 | Kondo et al. ................ 382/261 |
| 6,407,777 B1 | * | 6/2002 | DeLuca ....................... 348/576 |
| 6,424,789 B1 | * | 7/2002 | Abdel-Mottaleb ........... 386/52 |

* cited by examiner

Primary Examiner—Michael H. Lee
(74) Attorney, Agent, or Firm—Blakely, Sokoloff, Taylor & Zafman LLP

(57) ABSTRACT

An automatic video editing system identifies problems within frames in an input video, categorizes the frames by problem type, and edits the frames based on editing parameters for the category. A user can input values that override default values for the editing parameters and can choose to have certain frames remain unedited.

37 Claims, 4 Drawing Sheets

AUTOMATIC VIDEO EDITING

RELATED APPLICATIONS

This application claims the benefit of U.S. Provisional Application No. 60/181,788, filed Feb. 11, 2000.

FIELD OF THE INVENTION

This invention relates generally to digital video, and more particularly to automatic editing of digital video.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©1999, Sony Electronics, Inc., All Rights Reserved.

BACKGROUND OF THE INVENTION

Although many consumers take videos of their family vacations, parties and other events, these videos are frequently un-watchable. Common problems include jerkiness, too much time spent on one image, too rapid panning, out-of-focus frames, and poor viewpoints, among other. While video editing software exists for home computers, most demand too much knowledge and interaction by the amateur video photographer to be regularly used.

SUMMARY OF THE INVENTION

An automatic video editing system identifies a problem in a video frame in an input video and edits the video frame according to a set of editing parameters. While the automatic video editing system can process input video without any input from the user, the user may input values for the editing parameters that override default values. In one aspect, the resulting output video is displayed to the user and the user can elect to have certain frames from the input video restored, unedited, to the output video. In another aspect, the video frames with problems are classified into categories based on the problem identified and the editing parameters are applied to the frames by category. Because the automatic video editing system requires no user input, there is no need for the user to learn complicated video editing commands nor does the user have to constantly interact with the system.

The present invention describes systems, clients, servers, methods, and computer-readable redable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
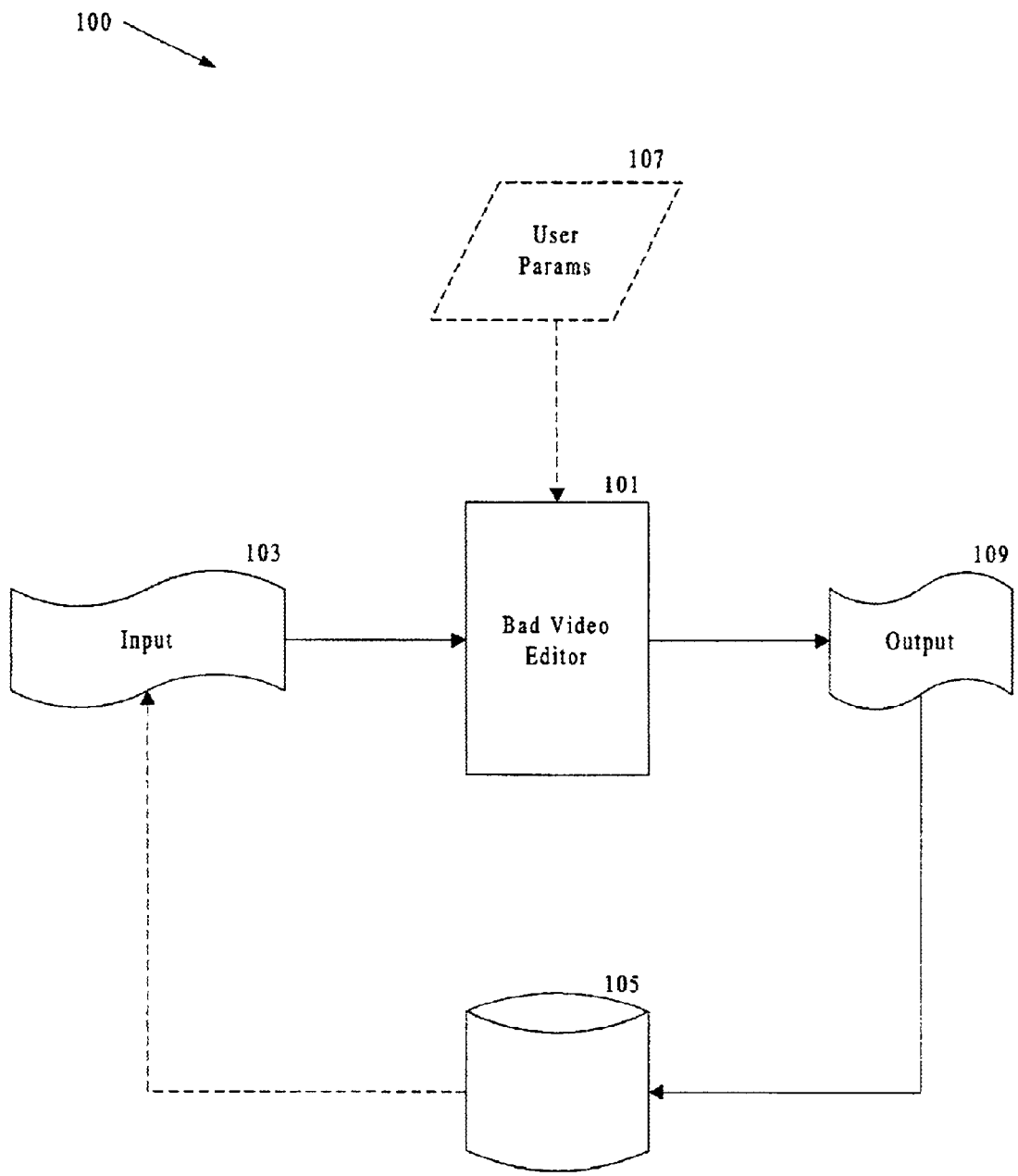
FIG. 1A is a diagram illustrating an overview of the operation of an embodiment of an automatic video editing system according to the invention.

Beginning with an overview of the operation of the invention, FIG. 1A illustrates one embodiment of an automatic video editing system 100 executing on a computer. A bad video editor 101 takes video input 103 that is specified by a user. The video input 103 may be directly input from a digital video recording device or it may have been previously stored on mass storage 105 in the computer. The bad video editor 101 allows the user to input optional parameters 107 to control the amount of editing performed (shown in phantom). Any input user parameters override corresponding default settings for the bad video editor 101.

The bad video editor 101 examines each frame of the input video 103 and compares it against subsequent and previous frames to determine problems in the video. Such problems include lack of motion through a sequence of consecutive frames, jerkiness caused by an unsteady camera, poor lighting, sequences that are too long, poor viewpoints (such as a camera pointed too high or too low in relationship to the horizon) and other common user mistakes. Additionally the bad video editor 101 detects if there are technical problems within a frame, such as dropouts or other types of defects.

After the bad video editor 101 has examined all the frames of the input video 103, it identifies those frames that should be eliminated or modified based on the default settings or the user input parameters. The bad video editor 101 edits the identified frames of the input video 103 to produces an output video 109 and stores the output video 109 on the mass storage 105. The output video 109 may replace the input video 103 or the input video 103 may be preserved. The output video 109 may be shown to the user on a display monitor.

In an embodiment not shown, when the input video 103 is preserved, the user can view the original frames of the video that have edited by the bad video editor 101 in conjunction with reviewing the output video 109. The bad video editor 101 allows the user to select a portion of the output video 109 using an input device such as a mouse or trackball. The bad video editor 101 identifies the original frames from the input video 103 that were edited in the selected portion and displays them to the user. The user can then elect to have one or more of the frames restored to the output video 109. Alternatively, the user can request all edited frames be displayed for review.

In yet another embodiment, at various points in the editing process, the current stage of the edited video is stored on mass storage 105 so that the user can decide whether to accept the edits prior to the entire input video 103 being modified.

Figure 1B:
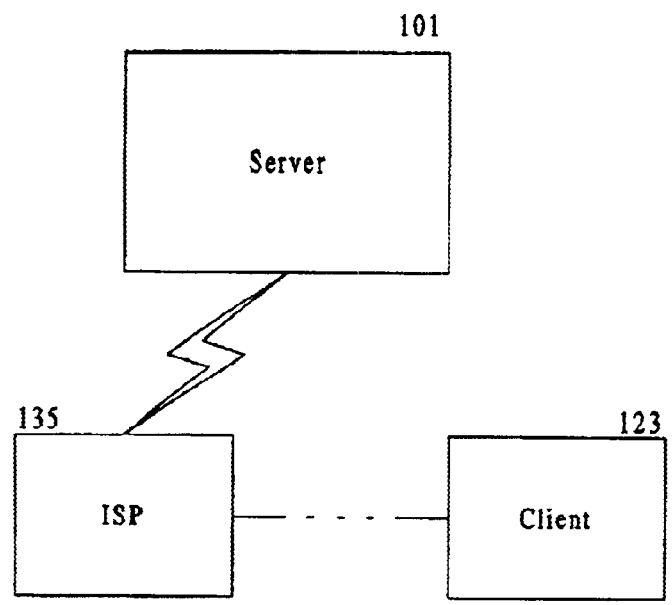
FIGS. 1B and 1C are diagrams of a computer environment suitable for practicing the invention.

The automatic video editing system 100 can be executed on a computer local to the user, such as a personal computer, or can execute on a remote server computer to which the user has access. In one embodiment, as shown in FIG. 1B, the remote server 101 is part of, or coupled to, an ISP (Internet Service Provider) 135 to provide content over the Internet. A client computer 123 executes a conventional Internet browsing application to send the input video to the server for editing by the automatic video editing system on the server and to review the output video on the client computer. The owner of the server may charge the user for use of the video editing services. It will be appreciated that various compensation schemes can be implemented by the server owner including as subscription servers, one-time charges, or session time without departing from the scope of the invention. In addition, the owner of the server may obtain revenue from banner advertisements that are displayed to the user of the client computer 123 during the processing of the input video when the automatic video editing system 100 is executed on the server. Such ads may be targeted to the user based on the problems identified in the video, e.g. a video that exhibits a great deal of jerkiness could cause an advertisement for camera tripods to appear. It is also readily apparent that the present invention is not limited to Internet access and Internet web-based sites; directly coupled and private networks are also contemplated.

Figure 1C:
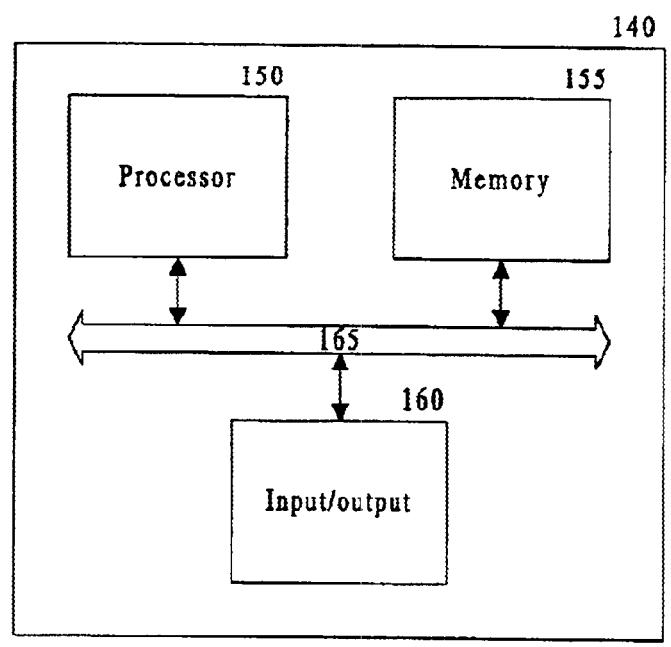

One embodiment of a computer system suitable for use as the local computer or the remote server is illustrated in FIG. 1C. The computer system 140, includes a processor 150, memory 155 and input/output capability 160 coupled to a system bus 165. The memory 155 is configured to store instructions which, when executed by the processor 150, perform the methods described herein. The memory 155 may also store the input and currently edited video content. Input/output 160 provides for the delivery and display of the video content or portions or representations thereof. Input/output 160 also encompasses various types of computer-readable media, including any type of storage device that is accessible by the processor 150. One of skill in the art will immediately recognize that the term "computer-readable medium/media" further encompasses a carrier wave that encodes a data signal. It will also be appreciated that the server 101 is controlled by operating system software executing in memory 155. Input/output and related media 160 store the computer-executable instructions for the operating system and methods of the present invention as well as the video content.

The description of FIGS. 1B–C is intended to provide an overview of computer hardware and other operating components suitable for implementing the invention, but is not intended to limit the applicable environments. It will be appreciated that the computer system 140 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Thus, an automatic video editing system corrects common video problems with little or no interaction on the part of the user, making the editing process easier and more likely to be used. While the invention is not limited to application to a particular set of video problems, for sake of clarity a simplified bad video editor that corrects example problems has been described.

Figure 2A:
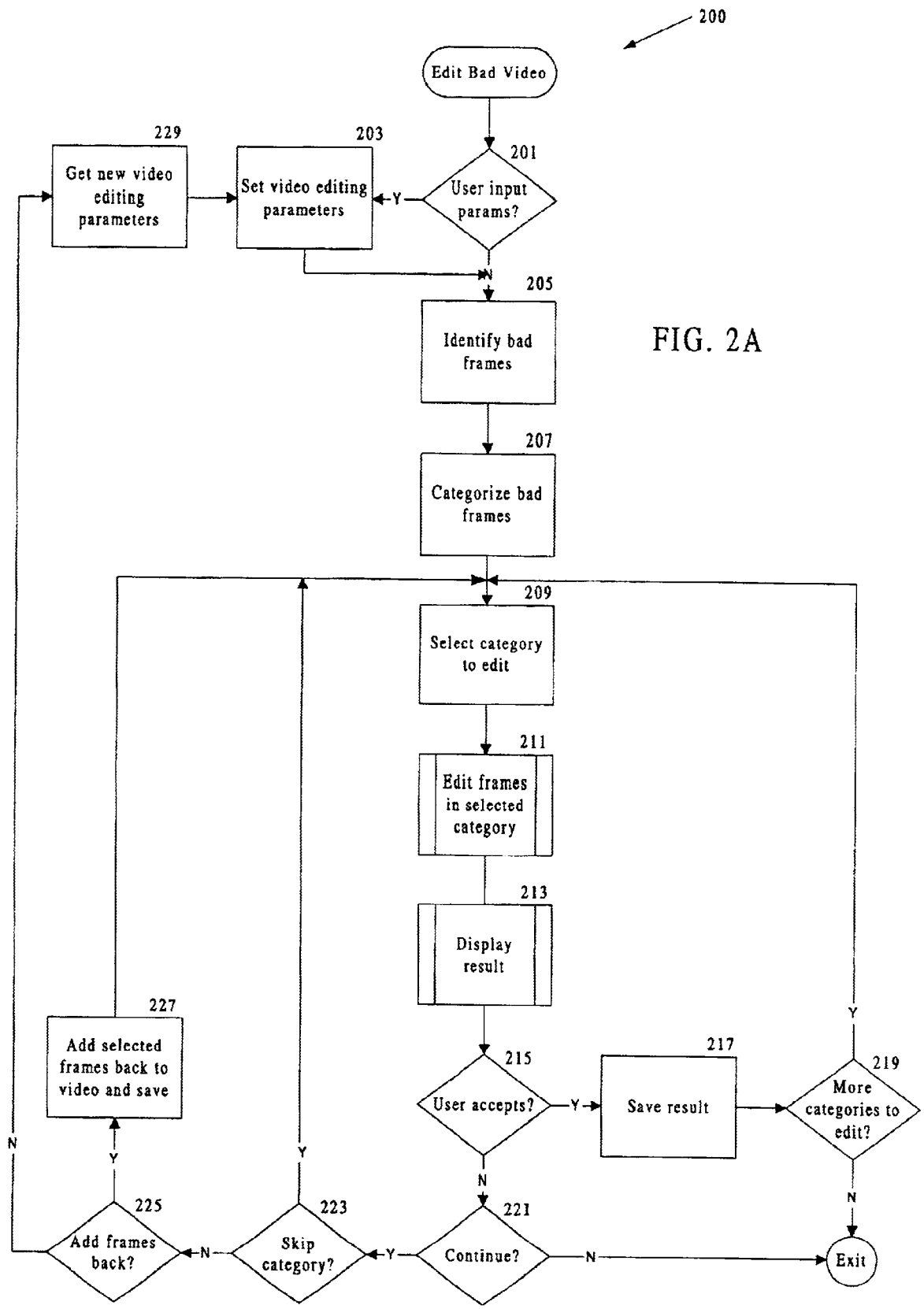
FIGS. 2A-C are flow diagrams of a method to be performed by a computer according to an embodiment of the invention.
Figures 2B, 2C:
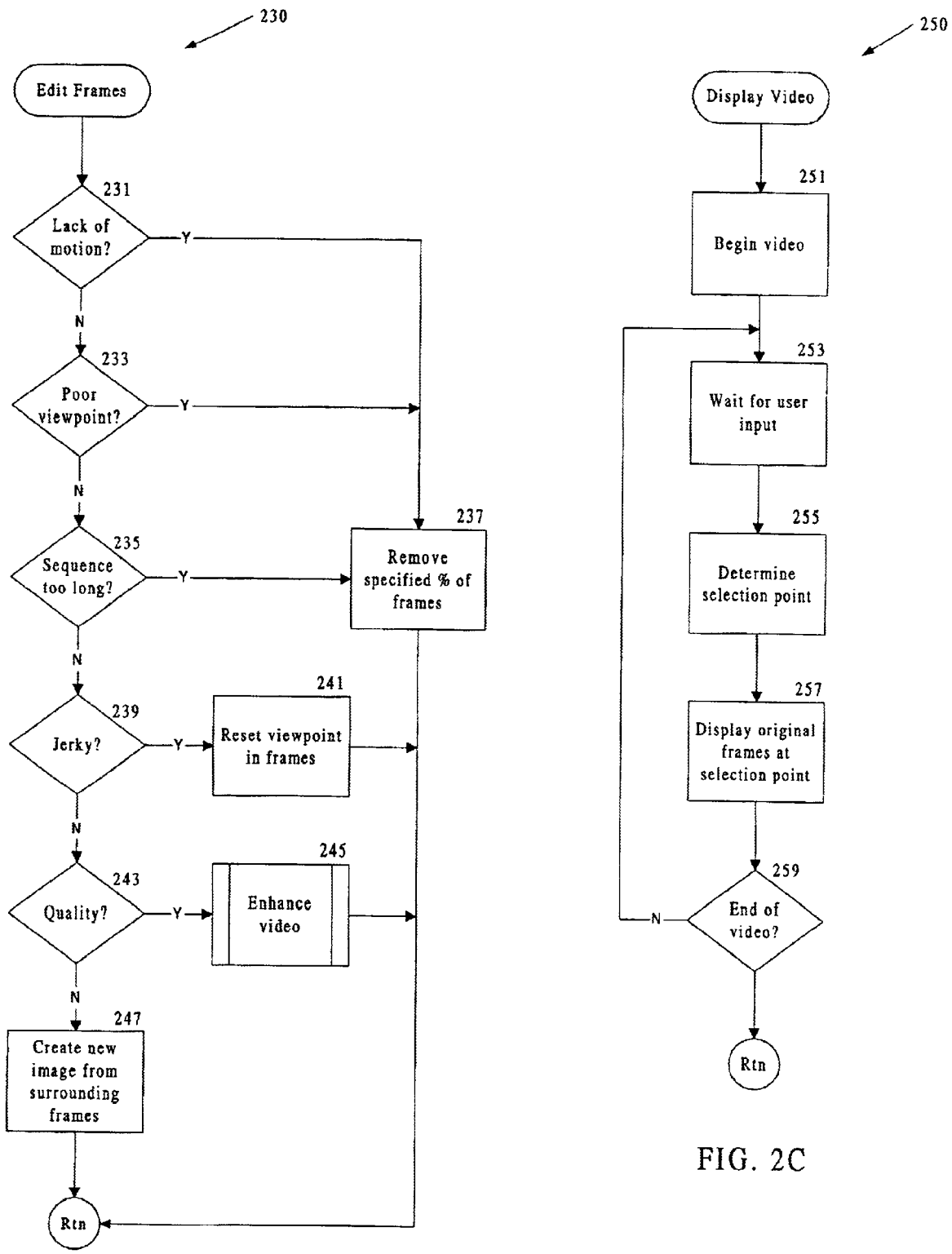

Next, the particular methods of the invention are described in terms of computer software with reference to a series of flow diagrams. FIGS. 2A–C illustrate methods that are executed on a computer, such as the server computer 101 or the client computer 123 in FIG. 1B, to automatically edit bad video according to the invention. The methods constitute computer programs made up of computer-executable instructions illustrated as blocks (acts) 201 until 229 in FIG. 1A, blocks 231 until 247 in FIG. 2B, and blocks 251 until 259 in FIG. 2C. Describing the methods by reference to a flow diagram enables one skilled in the art to develop such programs including such instructions to carry out the methods on suitably configured computers (the processor of the computer executing the instructions from computer-readable media) acting as either a local computer or a remote server. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It will be further appreciated that the instructions represented by the blocks in FIGS. 2A–C is not required to be performed in the order illustrated, and that all the processing represented by the blocks may not be necessary to practice the invention.

FIG. 2A illustrates an edit bad video method 200 while FIGS. 2B and 2C illustrate supporting methods 230 and 250. The edit bad video method 200 begins by determining whether the user has input parameters (block 201). If so, those parameters are used to set the video editing parameters for the session (block 203); otherwise, default parameters are used. The edit bad video method 200 identifies bad frames within the video (block 205). In one embodiment the identification is performed by comparing a frame with subsequent and previous frames to determine if there are certain types of video problem such as lack of motion, jerky motion, poor viewpoints etc. Once the bad frames have been identified, the method 200 categorizes each bad frame according to the type of problem exhibited by the frame (block 207). It will be appreciated that a frame may have more than one type of problem and, therefore, will fall into more than one category.

Once the frames have been categorized, one of the categories is selected for editing (block 209). The frames within the selected category are processed by an edit frames method 230 shown in FIG. 2B and explained further below. When all frames within a category have been edited (block 211), the edit video is displayed to the user (block 213) using a display result method 250 illustrated in FIG. 2C and explained further below. If the user accepts the edited video (block 215), then the result is saved at block 217 and the method 200 determines if there are more categories to edit at block 219. If all the categories containing bad video have been edited, than the method 200 exits. Otherwise, the method 200 returns to select the next category of bad video frames to edit at block 209.

If the user does not accept the currently edited video, the user may exit the program (block 221). If the user chooses to continue, the user is asked if the user wants to completely skip the current category (block 223). Assuming first that a category is to be skipped, the method 200 returns to block 209 and selects a new category to edit. The user may elect to have some, or all of the edited frames in the current category restored to the video at blocks 225 and 227 and then continue onto the next category. If the user wants to change the current editing parameters, the user can input new video editing parameters (block 229) to replace the current editing parameters (block 203). Under some circumstances, the new video editing parameters set by the user may require reidentification and re-categorization of the bad frames as represented by blocks 205 and 207.

Turning now to FIG. 2B, the edit frames method 230 is described. The edit frames method 230 edits the frames of bad video based on the categorization of the bad video. The embodiment shown in FIG. 2B edits six categories of bad video. One of skill in the art will readily conceive of alternate embodiments having more or fewer categories and different categories, and such alternate embodiments are considered within the scope of the invention. Moreover, it will be appreciated that related frames within each category are grouped together to produce sequences of bad frames and each bad frame is edited based on its relationship to the other frames in its sequence.

If the category is lack of motion (block 231), poor viewpoint (block 233), or too-long sequence (block 235), the edit frames method 230 removes a specified percentage of the frames within the category (block 237). The percentage of frames can pre-defined or user selected. In the present embodiment, a percentage of 1 removes only a few frames while a percentage of 100 instructs the method to remove almost all the frames.

If the frames are categorized as jerky (block 239), the edit frames method 230 examines each frame to determine the appropriate viewpoint for the frame and edits the frame to view the scene from the appropriate viewpoint (block 241), thus removing the jerkiness from the video. If the frames are of poor quality (block 243), i.e., out-of-focus, bad lighting, low contrast, etc., the edit frames video 230 processes the video at block 245 using commonly available algorithms that enhance the quality of the frames. If a frame is technically defective, the edit frames method 230 creates a new frame from the surrounding frames to cure the problem (block 247). In an alternate embodiment not shown, frames that lack motion (block 231) or have a poor viewpoint (block 233) are repaired at block 247 rather than being subject to the deletion process at block 237. In yet another embodiment, the processing represented by blocks 237, 241, 245 and 247 queries the user prior to performing the appropriate editing operation to allow the user to change the editing parameters or to abort the editing.

As described previously, the edit bad video method 200 may display the resulting video to the user using a display video method 250 illustrated in FIG. 2C. The display video method 250 begins playback of the video at block 251 and then waits for user input at block 253. When user input is received, the display video method 250 determines a selection point specified by the user (block 255) and displays the original frames that occur around the selection point (block 257). It will be appreciated that frames prior to and subsequent to the selection point can be displayed, frames after the selection point can be displayed, or frames before the selection point can be displayed. Additionally, the number of original frames that are displayed may be specified by default and modified by the user as part of the editing parameters input at block 201 in FIG. 2A. If there is more edited video to display, the display video method 250 returns to wait for additional user input at block 253. Once all the edited video has been displayed, the method 250 returns to the edit bad video method 200.

An automatic video editing system has been described that identifies and corrects bad video without requiring the user to master complex video principles and thus makes video editing easy and convenient for even the most unskilled video photographers. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that the video frames can be edited in the order in which they appear in the video instead of being edited by their category as described above.

The terminology used in this application with respect to digital video is meant to include all moving images captured in digital format and all non-digital moving images that have been converted into a digital representation. Therefore, it is manifestly intended that this invention be limited only by the following claims and equivalents thereof.

What is claimed is:

1. A computerized method for automatic video editing comprising:

automatically identifying a problem in a video frame in a plurality of video frames. comprising an input video;

classifying the video frame in a category based on the problem identified; and editing the video frame according to a set of editing parameters associated with the category to create an output video.

2. The computerized method of claim 1 further comprising:

displaying a video frame in the input video corresponding to a portion of the output video.

3. The computerized method of claim 2 further comprising:

replacing the portion of the output video with the video frame in the input video that was displayed.

4. The computerized method of claim 1, wherein one of the editing parameters is a value representing a percentage of the video frames in the category that are to be removed.

5. The computerized method of claim 4, wherein editing the video frame comprises:

removing the video frame as part of the percentage of video frames to be removed.

6. The computerized method of claim 1 further comprising:

obtaining a value for an editing parameter from a user; and substituting the value for a pre-determined value of the editing parameter.

7. The computerized method of claim 1, wherein editing the video frame comprises:

establishing a common viewpoint for a sequence of video frames in the input video; and editing the video frame to have the common viewpoint.

8. The computerized method of claim 1, wherein editing the video frame comprises:

applying an enhancement algorithm to the video frame.

9. The computerized method of claim 1 further comprising:

obtaining the input video from a user.

10. The computerized method of claim 9, wherein obtaining the input video comprises:

receiving the input video through a network connection.

11. The computerized method of claim 9 further comprising:

obtaining compensation from the user for editing the input video.

12. The computerized method of claim 9 further comprising:

displaying an advertisement to the user.

13. A computer-readable medium having computer-executable instructions to a cause a computer to perform a method comprising:

automatically identifying a problem in a video frame in a plurality of video frames comprising an input video;

classifying the video frame in a category based on the problem identified; and editing the video frame according to a set of editing parameters associated with the category to create an output video.

14. The computer-readable medium of claim 13 having further computer-executable instructions comprising:

displaying a video frame in the input video corresponding to a portion of the output video.

15. The computer-readable medium of claim 14 having further computer-executable instructions comprising replacing the portion of the output video with the video frame in the input video that was displayed.

16. The computer-readable medium of claim 13 having further computer-executable instructions comprising:

obtaining a value for an editing parameter from a user; and substituting the value for a pre-determined value of the editing parameter.

17. The computer-readable medium of claim 13, wherein the computer is a server computer coupled to a user computer through a network and having further computer-executable instructions comprising:

receiving the input video from the user computer through the network.

18. The computer-readable medium of claim 17 having further computer-executable instructions comprising:

obtaining compensation for editing the input video by the server computer.

19. The computer-readable medium of claim 17 having further computer-executable instructions comprising:

displaying an advertisement on the user computer.

20. An automatic video editing system comprising:

a processor; a memory coupled to the processor through a bus; and an edit bad video module executed by the processor to cause the processor to automatically identify a problem in a video frame in a plurality of video frames comprising an input video, to classify the video frame in a category based on the problem identified, and to edit the video frame according to a set of editing parameters associated with the category to create an output video.

21. The automatic video editing system of claim 20, wherein the edit bad video module further causes the processor to display a video frame in the input video corresponding to a portion of the output video.

22. The automatic video editing system of claim 21, wherein the edit bad video module further causes the processor to replace the portion of the output video with the video frame in the input video that was displayed.

23. The automatic video editing system of claim 20, wherein the edit bad video module further causes the processor to obtain a value for an editing parameter from a user, and to substitute the value for a pre-determined value of the editing parameter.

24. The automatic video editing system of claim 20, wherein one of the editing parameters is a value representing a percentage of the video frames in the category that are to be removed and the edit bad video module further causes the process to remove the video frame as part of the percentage of video frames to be removed.

25. The automatic video editing system of claim 20 further comprising:

a computer-readable medium coupled to the processor through the bus, the computer-readable medium having embodied thereon the edit bad video module.

26. An apparatus for automatic video editing comprising:

means for automatically identifying a problem in a video frame in a plurality of video frames comprising an input video;

means for classifying the video frame in a category based on the problem identified; and means for editing the video frame according to a set of editing parameters associated with the category to create an output video.

27. The apparatus of claim 26 further comprising:

means for displaying a video frame in the input video corresponding to a portion of the output video.

28. The apparatus of claim 27, further comprising:

means for replacing the portion of the output video with the video frame in the input video that was displayed.

29. The apparatus of claim 26, wherein one of the editing parameters is a value representing a percentage of the video frames in the category that are to be removed.

30. The apparatus of claim 29, wherein the means for editing the video frame comprises:

means for removing the video frame as part of the percentage of video frames to be removed.

31. The apparatus of claim 26 further comprising:

means for obtaining a value for an editing parameter from a user; and means for substituting the value for a pre-determined value of the editing parameter.

32. The apparatus of claim 26, wherein the means for editing the video frame comprises:

means for establishing a common viewpoint for a sequence of video frames in the input video; and means for editing the video frame to have the common viewpoint.

33. The apparatus of claim 26, wherein the means for editing the video frame comprises:

means for applying an enhancement algorithm to the video frame.

34. The apparatus of claim 26 further comprising:

means for obtaining the input video from a user.

35. The apparatus of claim 34, wherein the means for obtaining the input video comprises:

means for receiving the input video through a network connection.

36. The apparatus of claim 34 further comprising:

means for obtaining compensation from the user for editing the input video.

37. The apparatus of claim 34 further comprising:

means for displaying an advertisement to the user.

* * * * *